United States Patent
Tseng (10) Patent No.: US 8,194,610 B2
(45) Date of Patent: Jun. 5, 2012

(54) METHOD FOR ESTABLISHING A CONNECTION WITH A GENERIC ACCESS NETWORK AND ASSOCIATED GAN-ENABLED MOBILE STATION

(75) Inventor: Chien-Chih Tseng, Taoyuan (TW)

(73) Assignee: HTC Corporation (TW)

( * ) Notice: Subject to any disclaimer, the term of this patent is extended or adjusted under 35 U.S.C. 154(b) by 565 days.

(21) Appl. No.: 12/322,911

(22) Filed: Feb. 9, 2009

(65) Prior Publication Data

US 2010/0202366 A1    Aug. 12, 2010

(51) Int. Cl.
*H04W 36/36* (2009.01)
(52) U.S. Cl. .................................. 370/331; 455/437
(58) Field of Classification Search .............. 370/329, 370/465, 331; 455/437
See application file for complete search history.

(56) References Cited

U.S. PATENT DOCUMENTS

| | | | |
|---|---|---|---|
| 2008/0132274 A1* | 6/2008 | Yoo et al. | 455/552.1 |
| 2008/0181204 A1* | 7/2008 | Gallagher et al. | 370/354 |
| 2008/0205308 A1* | 8/2008 | Prehofer et al. | 370/310 |
| 2008/0305792 A1* | 12/2008 | Khetawat et al. | 455/435.1 |
| 2009/0304027 A1* | 12/2009 | Cormier | 370/469 |

OTHER PUBLICATIONS

3GPP TS 44.318 V8.4.0 (Dec. 2008), Release 8, Section 12.1.1 Timers on the mobile station side, pp. 228-230.*

* cited by examiner

*Primary Examiner* — Melvin Marcelo (57) ABSTRACT

A method for establishing a connection with a generic access network (GAN) and an associated GAN-enabled mobile station are provided. The method is used in the GAN-enabled mobile station. The method first issues a request message to the generic access network to request for connection establishment, and at the same time starts a timer with a timeout longer than five seconds. Then, the method determines a state of the GAN-enabled mobile station according to a response message corresponding to the request message when the response message is received within the timeout. In this manner, the GAN-enabled mobile station can increase the success rate of connection establishment with the generic access network.

8 Claims, 8 Drawing Sheets

| Round-trip time (Seconds) | 1 | 2 | 3 | 4 | 5 | 6 | 7 | 8 | 9 | Total Times |
|---|---|---|---|---|---|---|---|---|---|---|
| Times | 92 | 2 | 0 | 0 | 0 | 4 | 0 | 0 | 2 | 100 |

METHOD FOR ESTABLISHING A CONNECTION WITH A GENERIC ACCESS NETWORK AND ASSOCIATED GAN-ENABLED MOBILE STATION

BACKGROUND OF INVENTION

1. Field of the Invention

The present invention relates to Generic Access Network (GAN), and more particularly to a method for establishing a connection with a generic access network and an associated GAN-enabled mobile station.

2. Description of the Prior Art

Generic Access Network (GAN), also known as Unlicensed Mobile Access (UMA), is a mobile communication standard developed by the 3rd Generation Partnership Project (3GPP) that extends mobile services (voice or data) over IP access networks. In a generic access network, a GAN-enabled mobile station or user equipment can get mobile services by establishing an IP connection with a GAN controller (GANC), which connects to a mobile core network. The GAN-enabled mobile station establishes the IP connection with the GANC via wireless IP technology, e.g. Wi-Fi, Bluetooth, etc. The most common application of GAN is in a dual-mode handset service where subscribers can seamlessly roam and handover between wireless LANs and 2G/3G mobile networks by using a GAN-enabled mobile station, e.g. a GSM/Wi-Fi dual-mode mobile phone. Some mobile operators, such as Orange, T-Mobile, etc. have already begun to provide GAN/UMA service to their subscribers.

Figure 1:
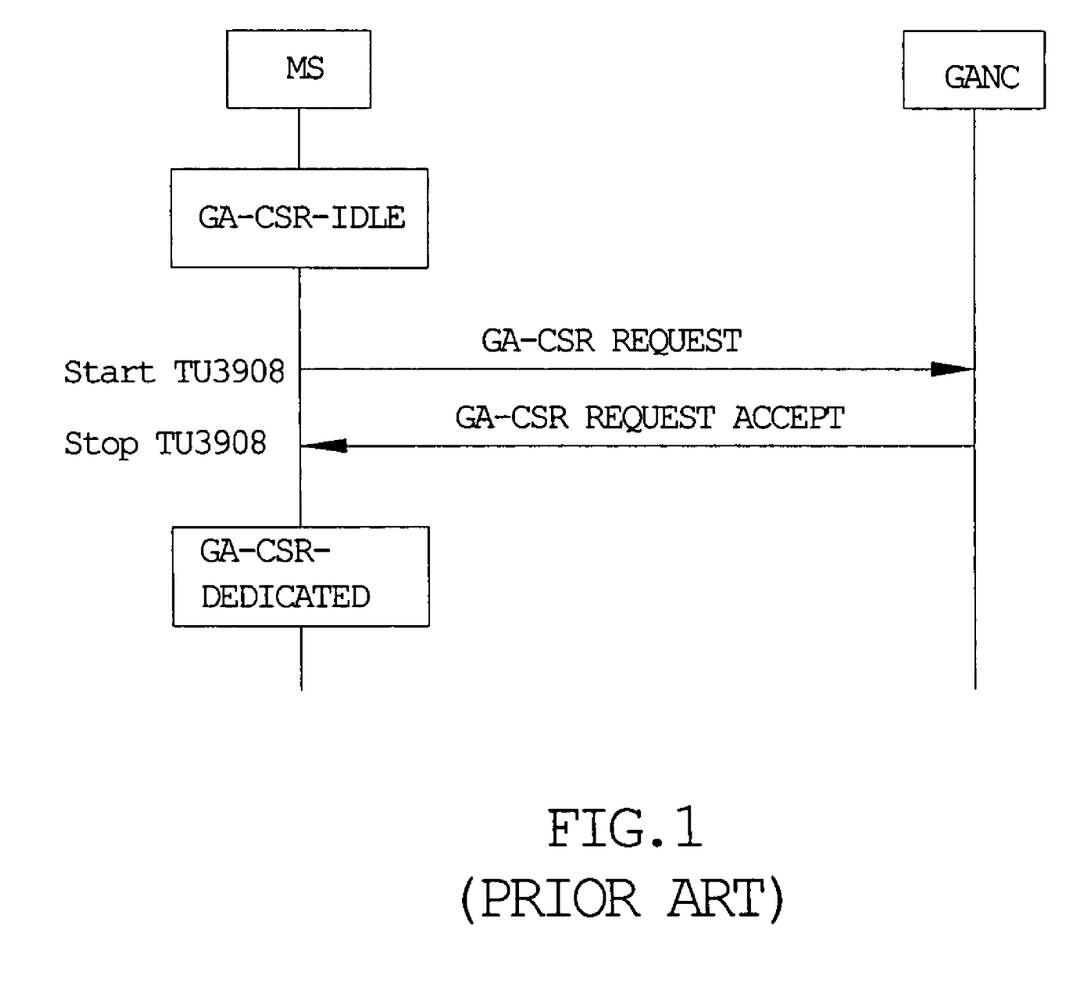
FIG. 1 and FIG. 2 are diagrams respectively showing a successful case and a failure case of initiation of a GA-CSR connection.
Figure 2:
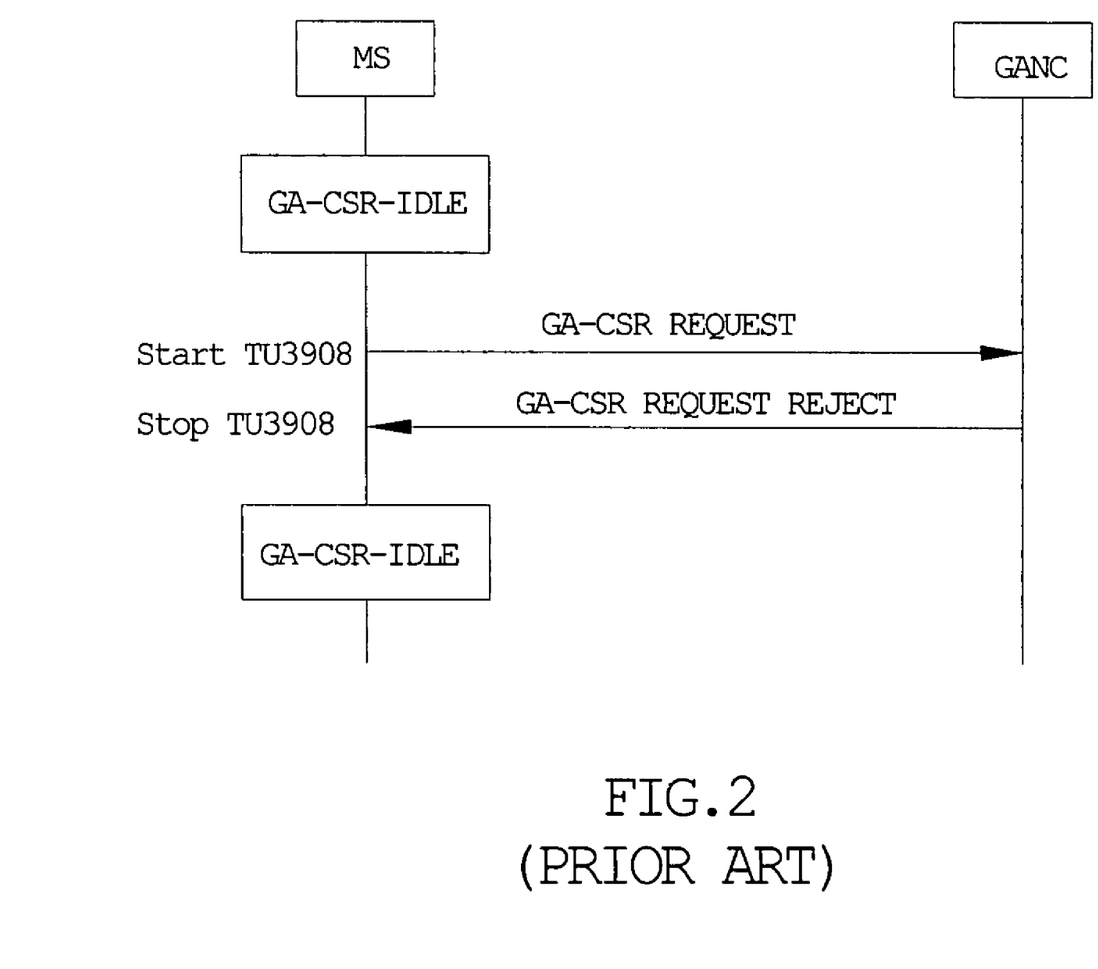

In current specification of 3GPP TS 44.318, it is defined how the GAN-enabled mobile station establishes a connection with the generic access network. FIG. 1 and FIG. 2 are diagrams respectively showing a successful case and a failure case of initiation of a Generic Access-Circuit Switched Resources (GA-CSR) connection. As shown, when a mobile station (denoted as MS) in GA-CSR-IDLE state initiates a GA-CSR connection via a GA-CSR REQUEST message to the GANC, the MS will also start the TU3908 timer with a default timeout of 5 seconds. If the MS receives a GA-CSR REQUEST ACCEPT message from the GANC within the timeout of the TU3908 timer, then the MS will stop the TU3908 timer and move into GA-CSR-DEDICATED state, as shown in FIG. 1; if the MS receives a GA-CSR REQUEST REJECT message from the GANC within the timeout of TU3908, then the MS will stop the TU3908 timer and remain in GA-CSR-IDLE state, as shown in FIG. 2.

However, if the MS does not receive any response from the GANC within the timeout of TU3908, which may result from that the GANC does not respond in time or even never respond to the MS (maybe due to weak RF signal or network traffic jam), then the MS just stays in GA-CSR-IDLE state according to 3GPP TS 44.318 section 7.1.4.1. The MS may retry to establish the connection several times, but the same no-response result can still occur because of the critical network environment. This incurs uncomfortable user experience.

Figure 3:
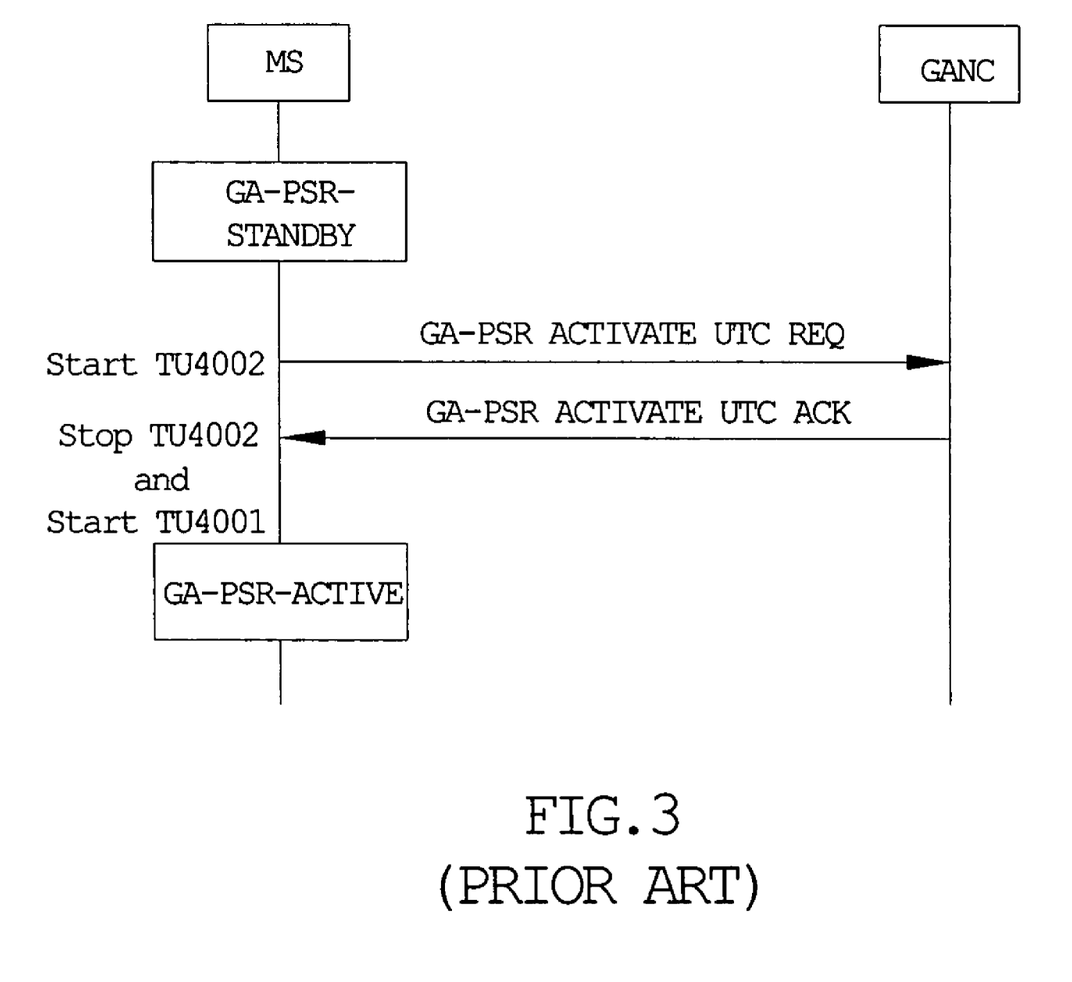
FIG. 3 is a diagram showing the initiation of a GA-PSR connection.

Similarly, the same problem happens in packet-switched service side. FIG. 3 is a diagram showing the initiation of a Generic Access-Packet Switched Resources (GA-PSR) connection. As shown, when the MS in GA-PSR-STANBY state initiates a GA-PSR connection via a GA-PSR ACTIVATE UTC REQ message to the GANC, the MS will also start the TU4002 timer with a default timeout of 5 seconds. If the MS receives a GA-PSR ACTIVATE UTC ACK message from the GANC within the timeout of the TU4002 timer, the MS will stop the TU4002 timer, start the TU4001 timer, and move into GA-PSR-ACTIVE state, as shown in FIG. 3. However, if the MS does not receive any response from the GANC within the timeout of TU4002, then the MS has the chance to stick in the idle state and cannot initiate any packet-switched service.

SUMMARY OF INVENTION

It is therefore one objective of the present invention to provide a method for establishing a connection with a generic access network, thereby helping a GAN-enabled mobile station to increase the success rate of connection establishment in the generic access network.

Another objective of the present invention is to provide a method for establishing a connection with a generic access network, thereby preventing a GAN-enabled mobile station from sticking in an idle state due to no response from the generic access network.

Another objective of the present invention is to provide a GAN-enabled mobile station which can increase the success rate of connection establishment with a generic access network and prevent from sticking in an idle state due to no response from the generic access network.

In one embodiment of the present invention, a method used in a mobile station for establishing a connection with a generic access network is provided. The method comprises: issuing a request message to the generic access network to request for establishment of the connection; starting a timer with a timeout longer than five seconds; and determining a state of the mobile station according to a response message corresponding to the request message when the response message is received within the timeout.

In another embodiment of the present invention, a GAN-enabled mobile station is provided. The GAN-enabled mobile station comprises: an issuing means for issuing a request message to a generic access network to request for establishment of a connection; a starting means for starting a timer with a timeout longer than five seconds; and a determining means for determining a state of the GAN-enabled mobile station according to a response message corresponding to the request message when the response message is received within the timeout.

DETAILED DESCRIPTION

Figure 4:
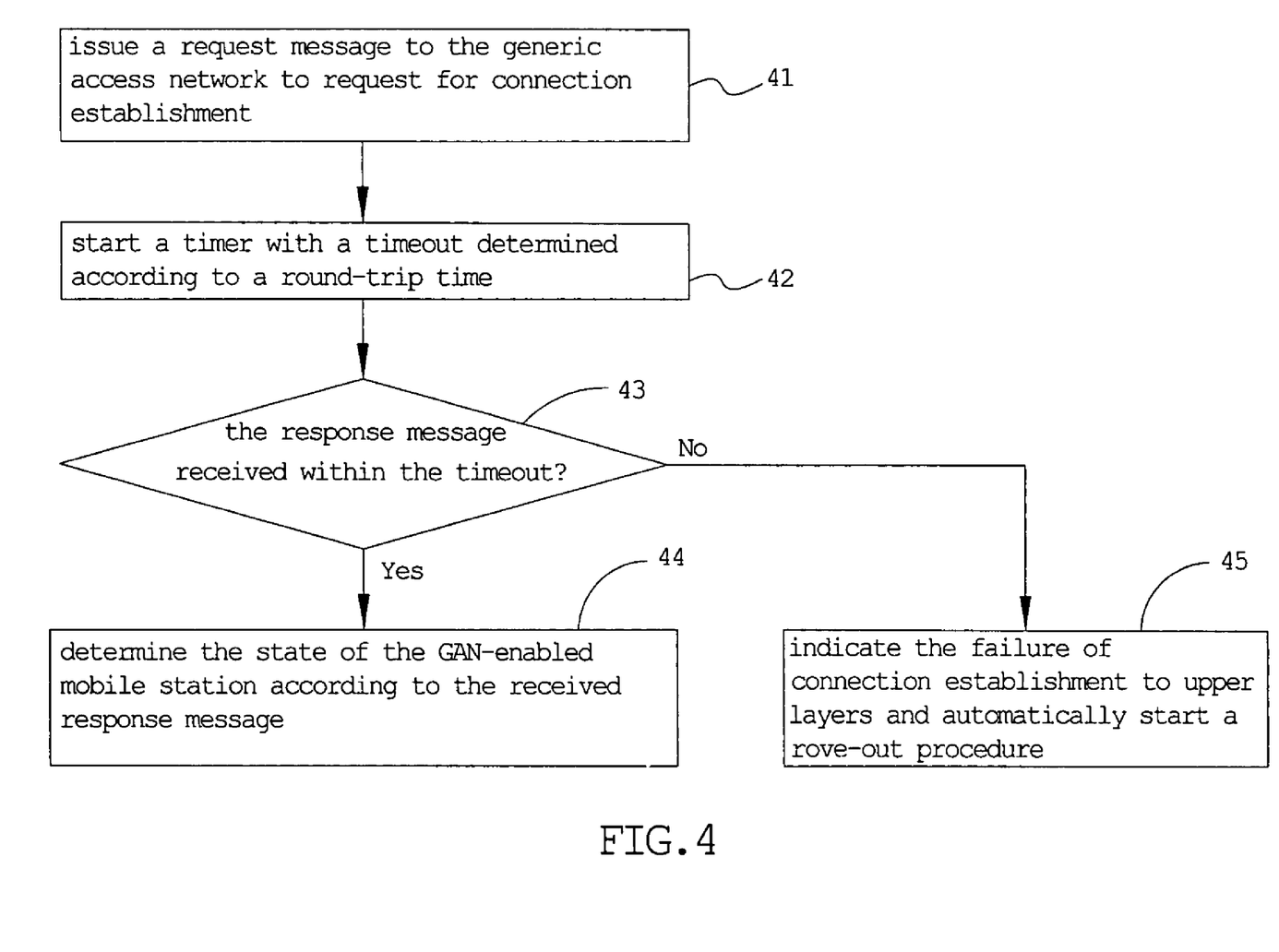
FIG. 4 is a flow chart of a method for establishing a connection with a generic access network according to an embodiment of the present invention.

Reference will now to be made in detail to embodiments of the invention, which are illustrated in the accompanying drawings. FIG. 4 is a flow chart of a method for establishing a connection with a generic access network according to an embodiment of the present invention. The method is used in a GAN-enabled mobile station. In step 41, a request message is issued to the generic access network to request for establishment of the connection. If the connection is a GA-CSR connection, then the issued request message is a GA-CSR REQUEST message; if the connection is a GA-PSR connection, then the issued request message is a GA-PSR ACTIVATE UTC REQ message.

In step 42, a timer with a timeout is started. The timer is built in the GAN-enabled mobile station to help to control the process of connection establishment. The timeout of the timer is determined according to a round-trip time starting from the issuing of the request message until the receiving of a response message from the generic access network. Preferably, the timeout is not shorter than a maximum duration of the round-trip time so as to cover all possible cases, except the case of never receiving the response message.

Figure 5:
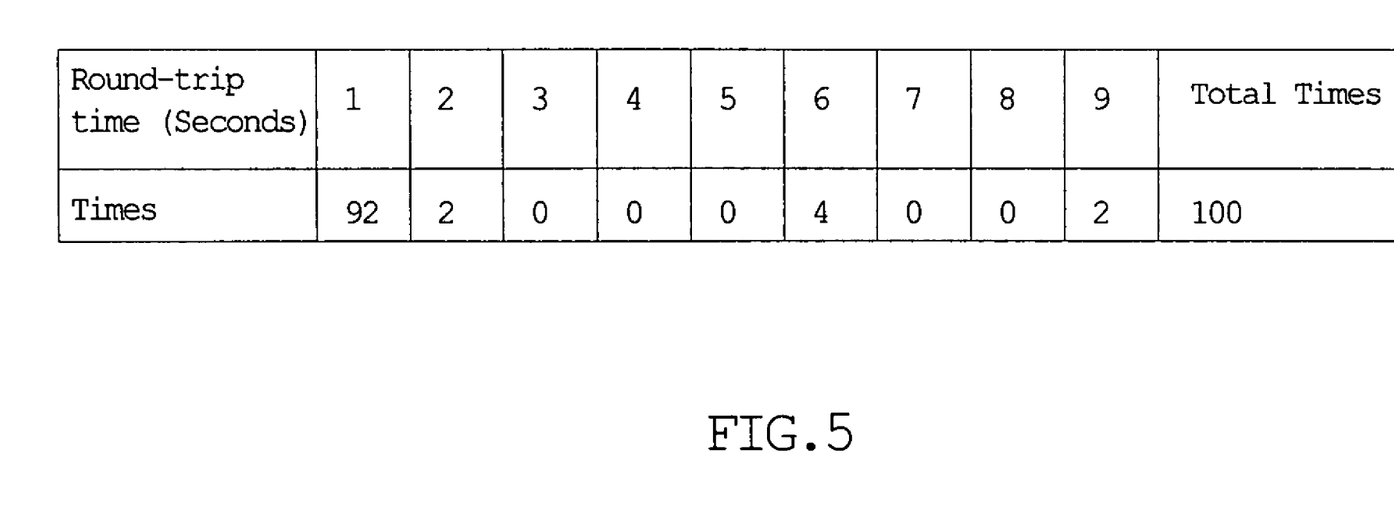
FIG. 5 shows a stats table summarizing the results of experiments and field trials.

If the connection to be established is the GA-CSR connection, the timer is a TU3908 timer; if the GA-PSR connection, then the timer is a TU4002 timer. In current 3GPP TS 44.318, the default timeout of both TU3908 and TU4002 timers is 5 seconds. However, after many experiments and practical field trials in real networks (e.g. the generic access networks in U.S. and Europe), it is found that this default timeout may cause an undesirable success rate of establishment of GA-CSR/GA-PSR connections. FIG. 5 shows a stats table summarizing the results of the experiment and field trial. The stats table lists the times of receiving the response message within different round-trip times after 100 request messages were issued, for example, the times occurred within the round-trip time of 0~1 second was 92, the times occurred within 1~2 seconds was 2, etc. It can be found from the stats table that if the timeout of TU3908 and TU4002 is set as 5 seconds, then six times of receiving the response message may be ignored (four times occurred within 5~6 seconds and two times occurred within 8~9 seconds) and the success rate of connection establishment is just 94%, which is unfavorable to high reliability network service. Thus, in one embodiment of the present invention, the timeout of both TU3908 and TU4002 is prolonged to longer than 5 seconds, thereby increasing the success rate of establishment of GA-CSR/GA-PSR connections. Preferably, the timeout of both TU3908 and TU4002 is prolonged to 9 seconds, so as to achieve a double benefit of maximizing the success rate of connection establishment while also avoiding unnecessary waiting time. The timeout of 9 seconds is also long enough to accommodate the round-trip delay in most critical network environments, according to the experiment and field trial results.

In step 43, it is determined whether the response message is received from the generic access network within the timeout of the timer. If the connection is a GA-CSR connection, then the response message is a GA-CSR REQUEST ACCEPT message or a GA-CSR REQUEST REJECT message; if the connection is a GA-PSR connection, then the response message is a GA-PSR ACTIVATE UTC ACK message. If the response message is received within the timeout, the flow proceeds to step 44; otherwise, the flow proceeds to step 45.

In step 44, the state of the GAN-enabled mobile station is determined according to the response message received within the timeout. More specifically, when the received response message is the GA-CSR REQUEST ACCEPT message, the state of the GAN-enabled mobile station is the GA-CSR-DEDICATED state; when the response message is the GA-CSR REQUEST REJECT message, the state of the GAN-enabled mobile station is the GA-CSR-IDLE state; when the response message is the GA-PSR ACTIVATE UTC ACK message, the state of the GAN-enabled mobile station is the GA-PSR-ACTIVE state.

In step 45, since the response message is not received within the timeout, the GAN-enabled mobile station performs corresponding operations as follows:

(1) indicating the failure of connection establishment to upper layers of the GAN-enabled mobile station, which include upper layer protocols or applications executed thereon. Since the process of GA-CSR/GA-PSR connection establishment belongs to Layer 3, the upper layer is above Layer 3.

(2) automatically starting a rove-out procedure to rove out to a 3GPP access network (e.g. GSM/UMTS network). The rove-out procedure includes changing the state of the GAN-enabled mobile station to a Generic Access-Resource Control (GA-RC) De-Registered state so as to leave the generic access network. By automatically performing the rove-out procedure, the mobile station can request the mobile service from another mobile network without need of user intervention, thereby preventing from sticking in the idle state and also bringing better user experience.

Figure 6:
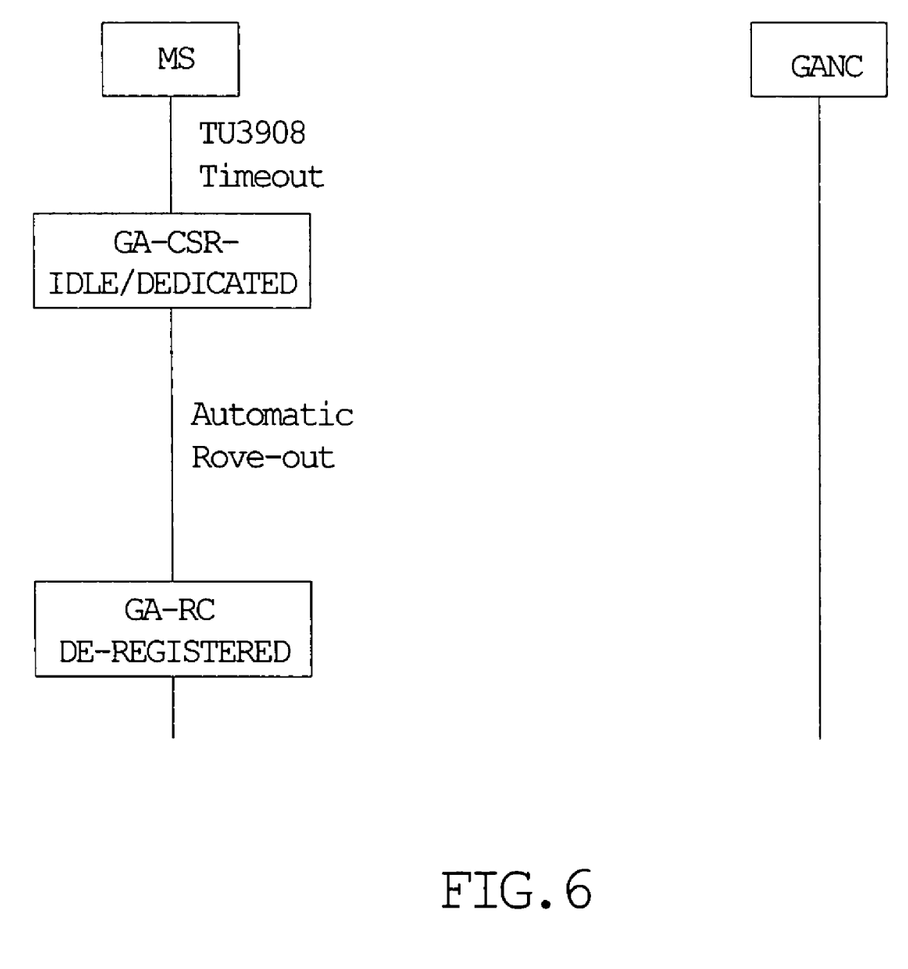
FIG. 6 shows a rove-out procedure performed when the GA-CSR connection establishment is failed.
Figure 7:
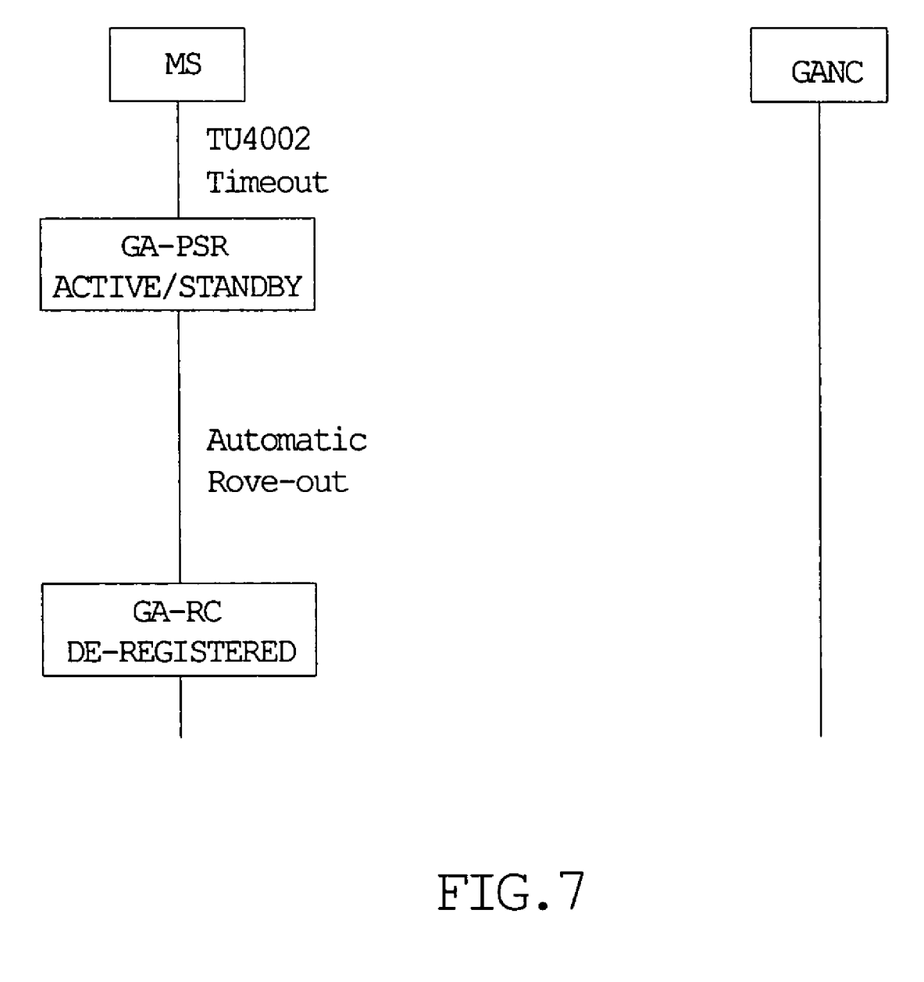
FIG. 7 shows a rove-out procedure performed when the GA-PSR connection establishment is failed.

FIG. 6 shows the initiation of the rove-out procedure when the GA-CSR connection establishment is failed. When the GA-CSR REQUEST ACCEPT message or GA-CSR REQUEST REJECT message is not received within the timeout of TU3908, the MS starts the rove-out procedure automatically and changes to the GA-RC De-Registered state to leave the generic access network. FIG. 7 shows the initiation of the rove-out procedure when the GA-PSR connection establishment is failed. When the GA-PSR ACTIVATE UTC ACK message is not received within the timeout of TU4002, the MS starts the rove-out procedure automatically and changes to the GA-RC De-Registered state to leave the generic access network.

In a preferred embodiment, the timeout of the timer is dynamically adjusted according to the current round-trip time between the issuing of the request message and the receiving of the response message. For example, if the response message is not received from the generic access network within the timeout, it suggests that the current network environment may be in a critical state such that the current round-trip time is longer than the current timeout of the timer. Thus, the timeout of the timer is prolonged to fit in with the current network environment, thereby increasing the success rate of connection establishment.

In one embodiment, the GAN-enabled mobile station capable of performing the method of the present invention comprises an issuing means, a first starting means, a determining means, a second starting means and an adjusting means. The issuing means is for issuing a request message to a generic access network to request for establishment of a connection; the first starting means is for starting a timer with a timeout longer than five seconds; the determining means is for determining a state of the GAN-enabled mobile station according to a response message corresponding to the request message when the response message is received within the timeout; the second starting means is for starting a rove-out procedure to rove out to another network (e.g. 3GPP access network) when the response message is not received within the timeout; the adjusting means is for adjusting the timeout of the timer according to a round-trip time between the issuing of the request message and the receiving of the response message, for example, the adjusting means can be a prolonging means for prolonging the timeout of the timer when the response message is not received within the timeout.

Figure 8:
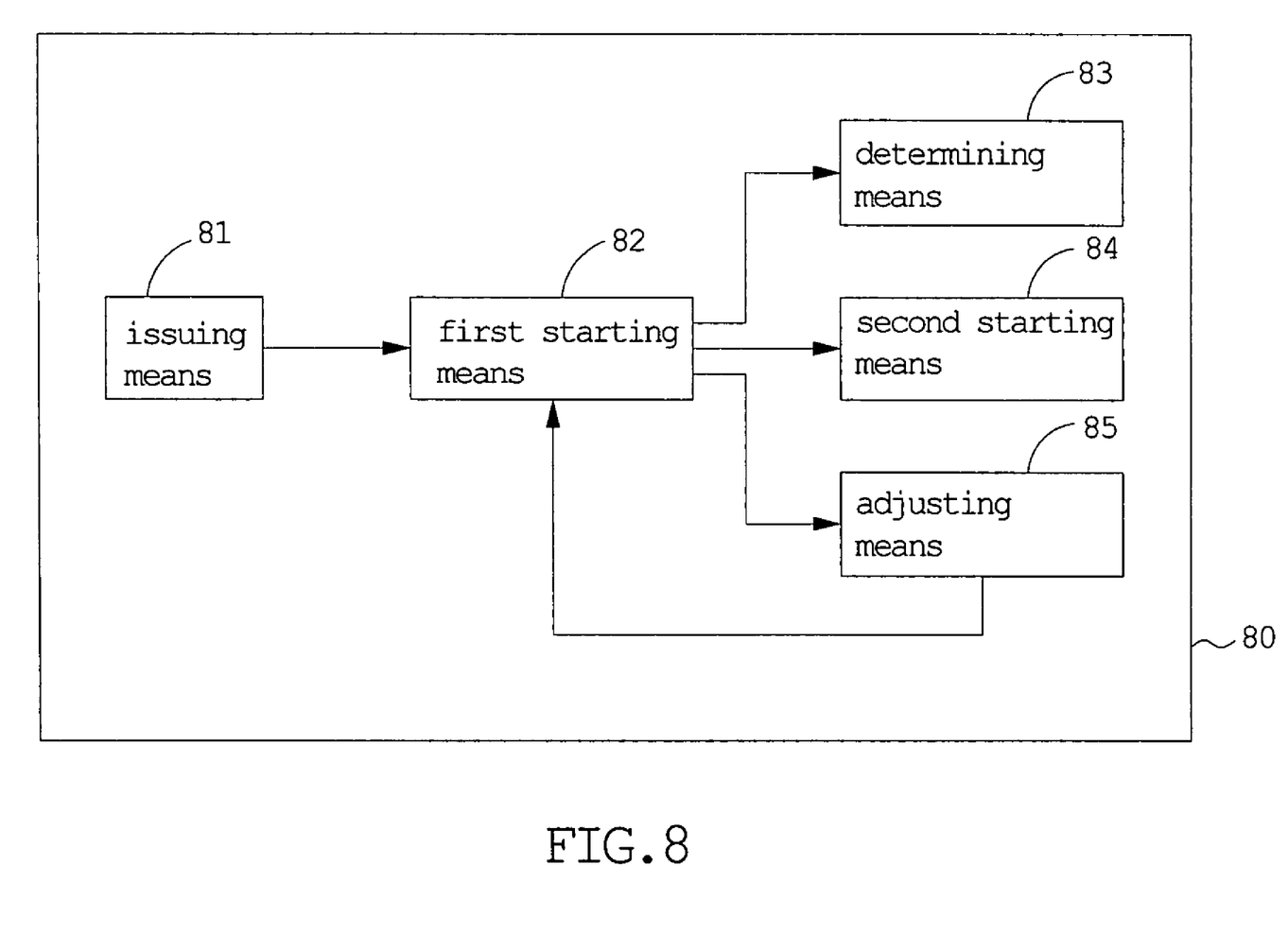
FIG. 8 shows a block diagram of an embodiment of a GAN-enabled mobile station according to the present invention.

In this embodiment, all of the issuing means, the first starting means, the determining means, the second starting means and the adjusting means can be implemented by software. FIG. 8 shows a block diagram of an embodiment of the GAN-enabled mobile station 80, where the blocks of the issuing means 81, the first starting means 82, the determining means 83, the second starting means 84 and the adjusting means 85 represent software modules executed by the GAN-enabled mobile station 80.

While the present invention has been shown and described with reference to the preferred embodiments thereof and the illustrative drawings, it should not be considered as limited thereby. Various possible modifications and alterations can be conceived by persons skilled without departing from the scope and the spirit of the present invention.

What is claimed is:

1. A method used in a mobile station for establishing a connection with a generic access network (GAN), the method comprising:

the mobile station issuing a request message to the GAN to request for establishment of the connection;

the mobile station starting a timer with a timeout longer than five seconds; and the mobile station determining a state of the mobile station according to a response message corresponding to the request message when the response message is received within the timeout, and the mobile station starting a rove-out procedure to rove out to another network when the response message is not received within the timeout.

2. The method of claim 1, wherein the timeout of the timer is no more than nine seconds.

3. The method of claim 1, wherein the connection is a Generic Access-Circuit Switched Resources (GA-CSR) connection or a Generic Access-Packet Switched Resources (GA-PSR) connection.

4. The method of claim 3, wherein when the connection is the GA-CSR connection, the request message is a GA-CSR REQUEST message and the response message is a GA-CSR REQUEST ACCEPT message or a GA-CSR REQUEST REJECT message; when the connection is the GA-PSR connection, the request message is a GA-PSR ACTIVATE UTC REQ message and the response message is a GA-PSR ACTIVATE UTC ACK message.

5. The method of claim 4, wherein when the response message is the GA-CSR REQUEST ACCEPT message, the state of the mobile station is a GA-CSR-DEDICATED state; when the response message is the GA-CSR REQUEST REJECT message, the state of the mobile station is a GA-CSR-IDLE state; when the response message is the GA-PSR ACTIVATE UTC ACK message, the state of the mobile station is a GA-PSR-ACTIVE state.

6. The method of claim 1, wherein the rove-out procedure comprises changing the state of the mobile station to a Generic Access-Resource Control (GA-RC) De-Registered state when the response message is not received within the timeout, so as to prevent the mobile station from sticking in an idle state due to the response message is not received from the GAN within the timeout.

7. The method of claim 1, further comprising adjusting the timeout of the timer according to a round-trip time between the issuing of the request message and the receiving of the response message.

8. The method of claim 6, further comprising prolonging the timeout of the timer when the response message is not received within the timeout; wherein the mobile station is GAN-enabled and is a dual-mode mobile phone.

* * * * *